Figure 5:
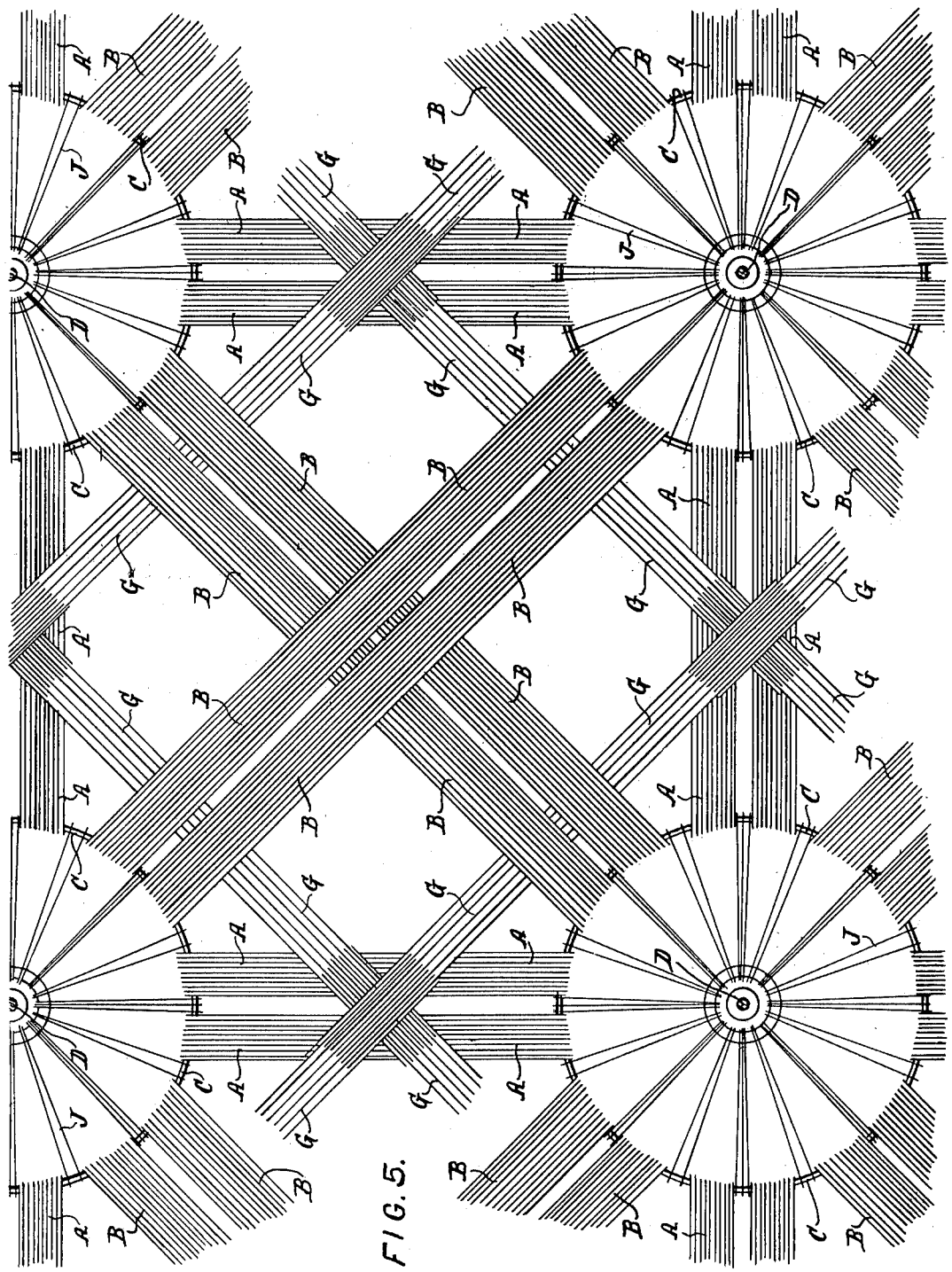

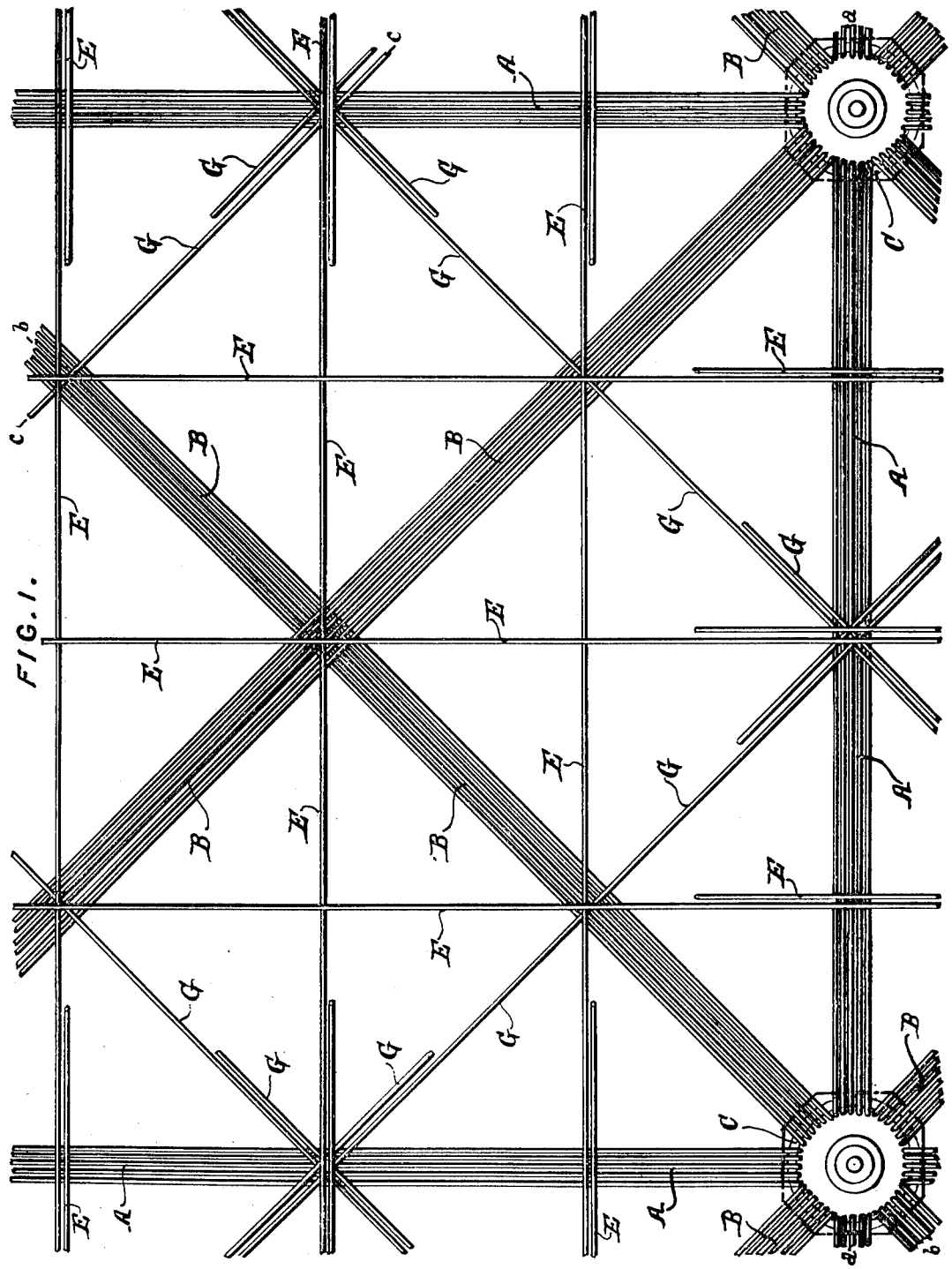

R. & W. A. THOMSON.
FERROCONCRETE FLOOR.
APPLICATION FILED OCT. 12, 1911.
1,074,072.
Patented Sept. 23, 1913.
8 SHEETS—SHEET 2.
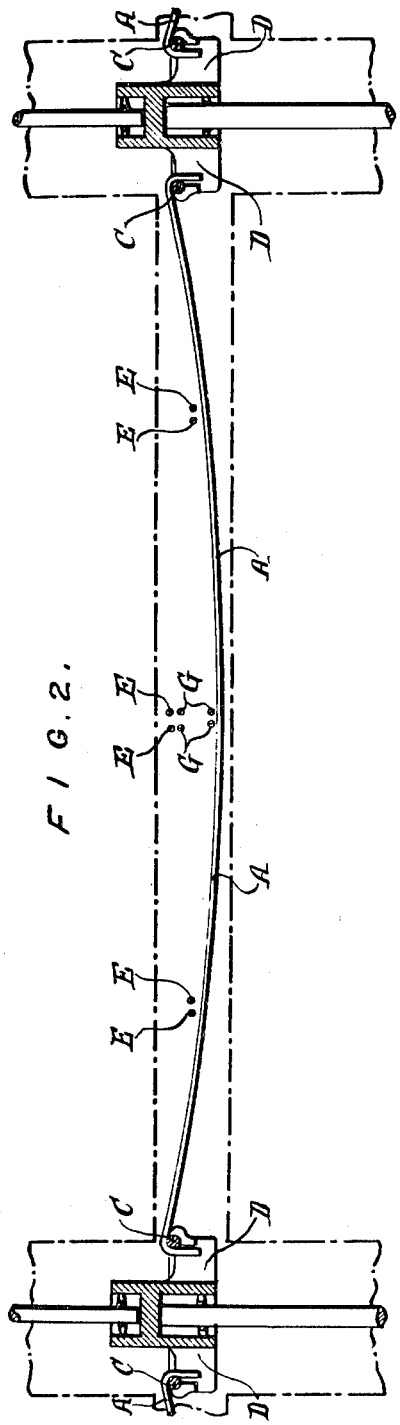
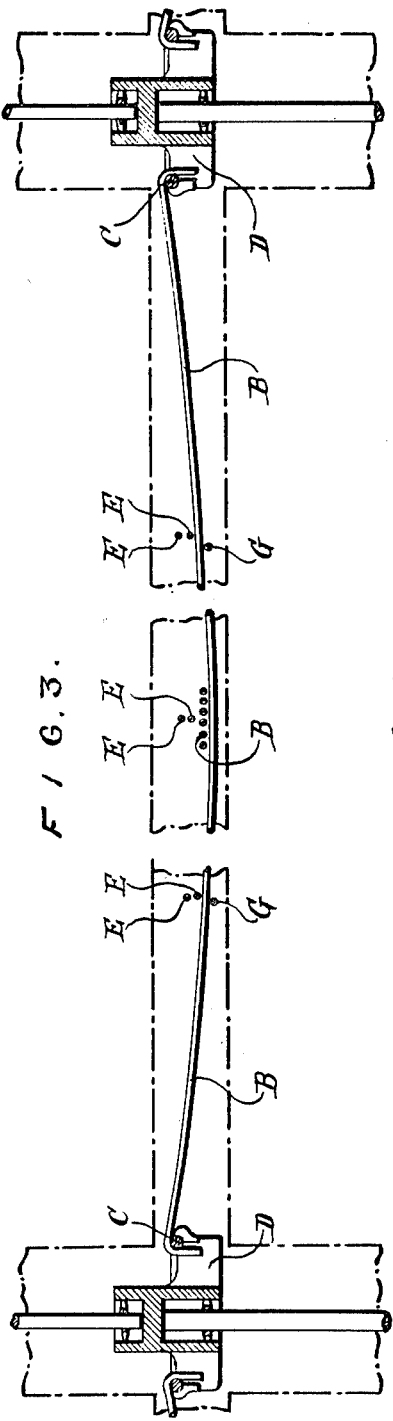
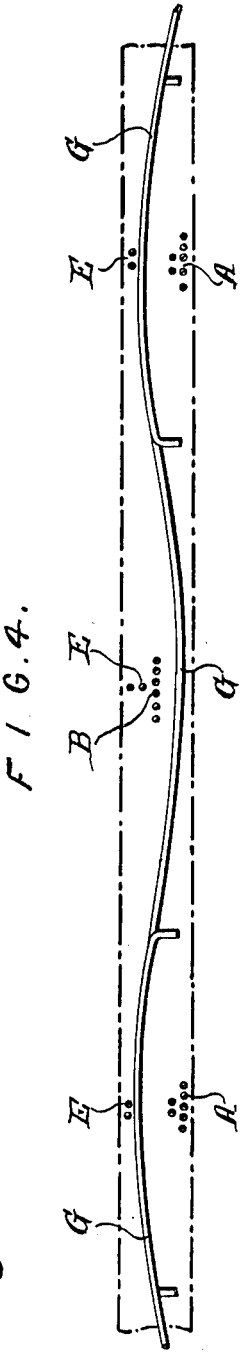
WITNESSES
INVENTORS
ROBERT THOMSON
WILLIAM AFFLECK THOMSON

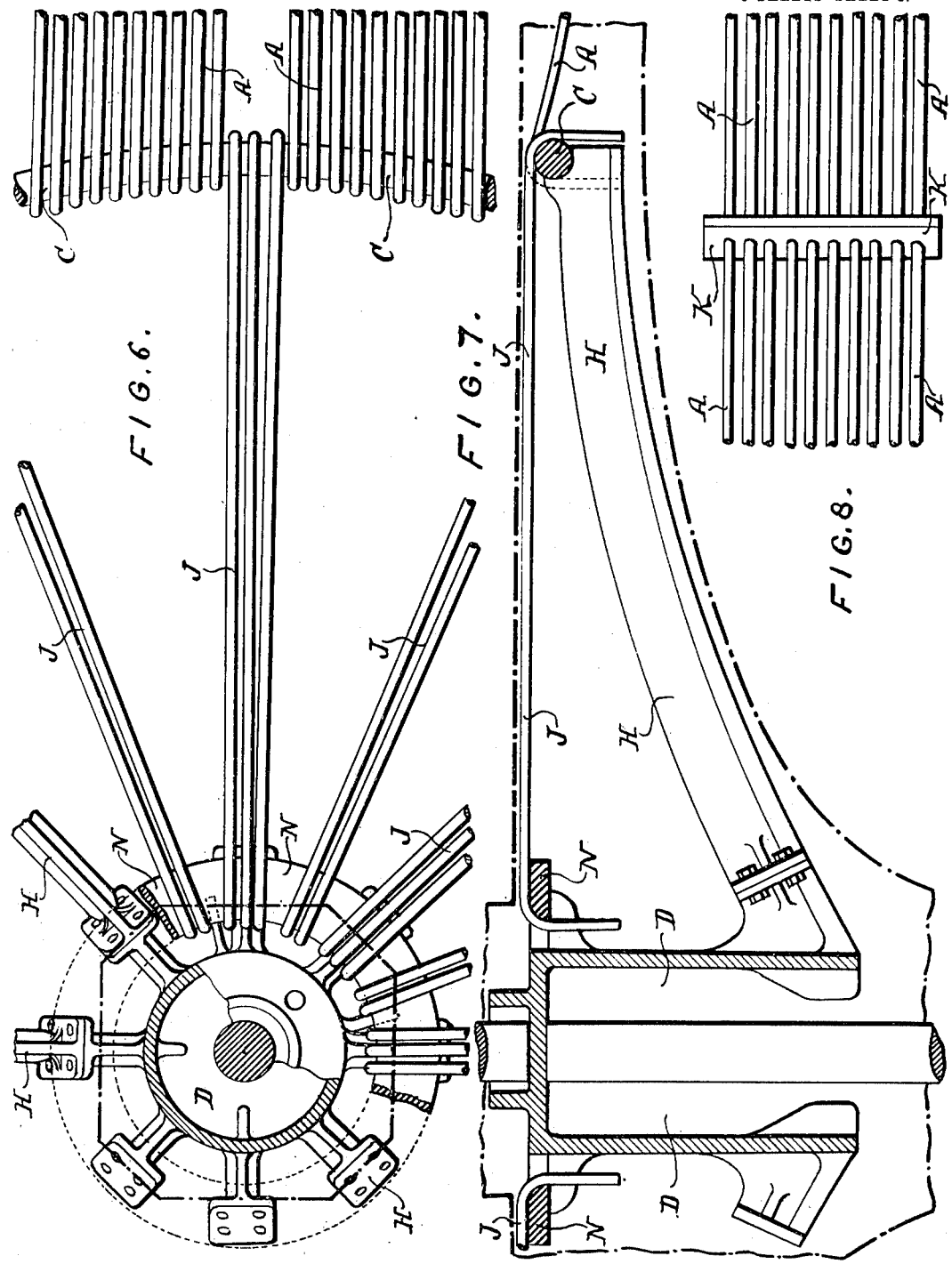

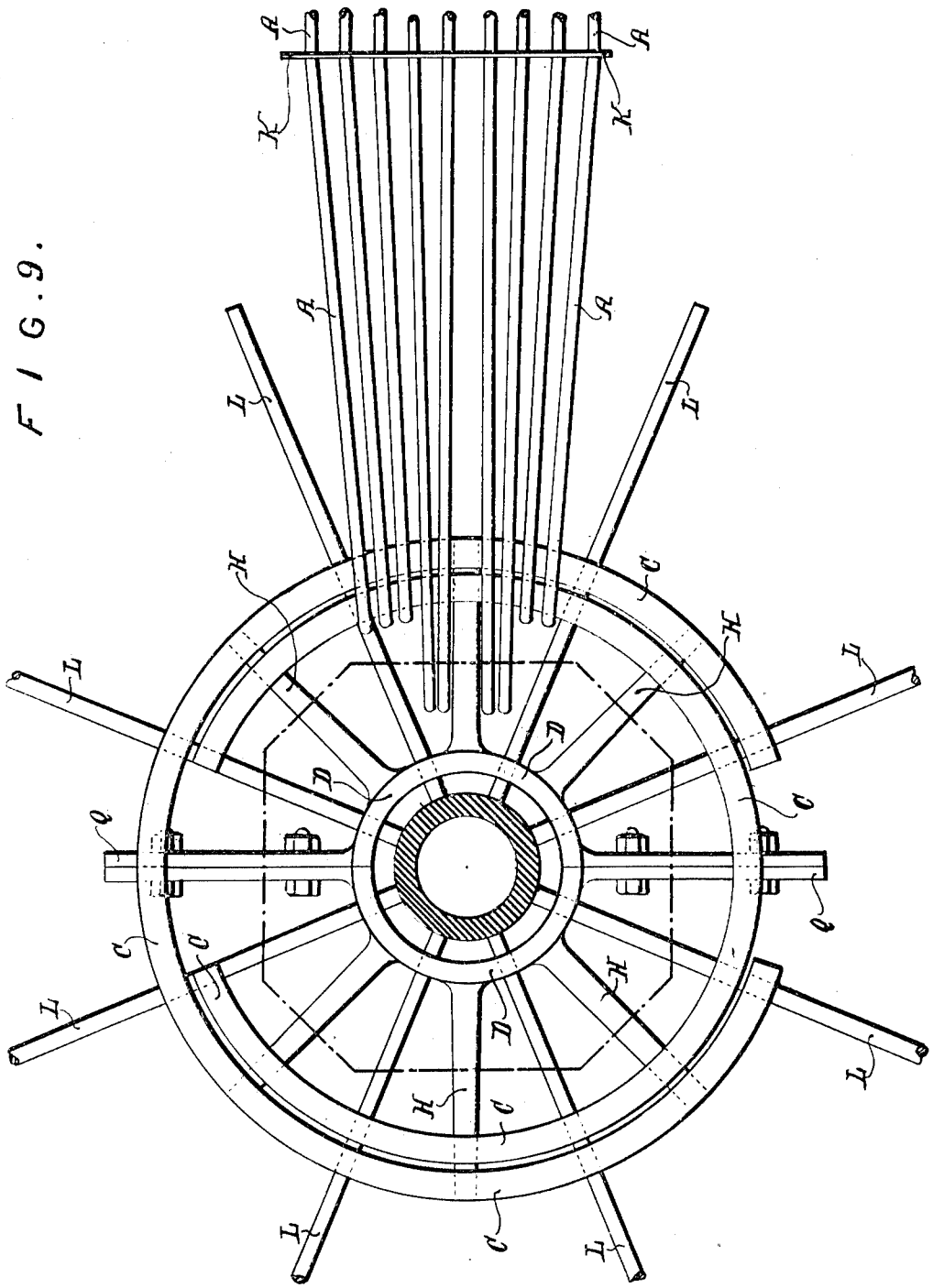

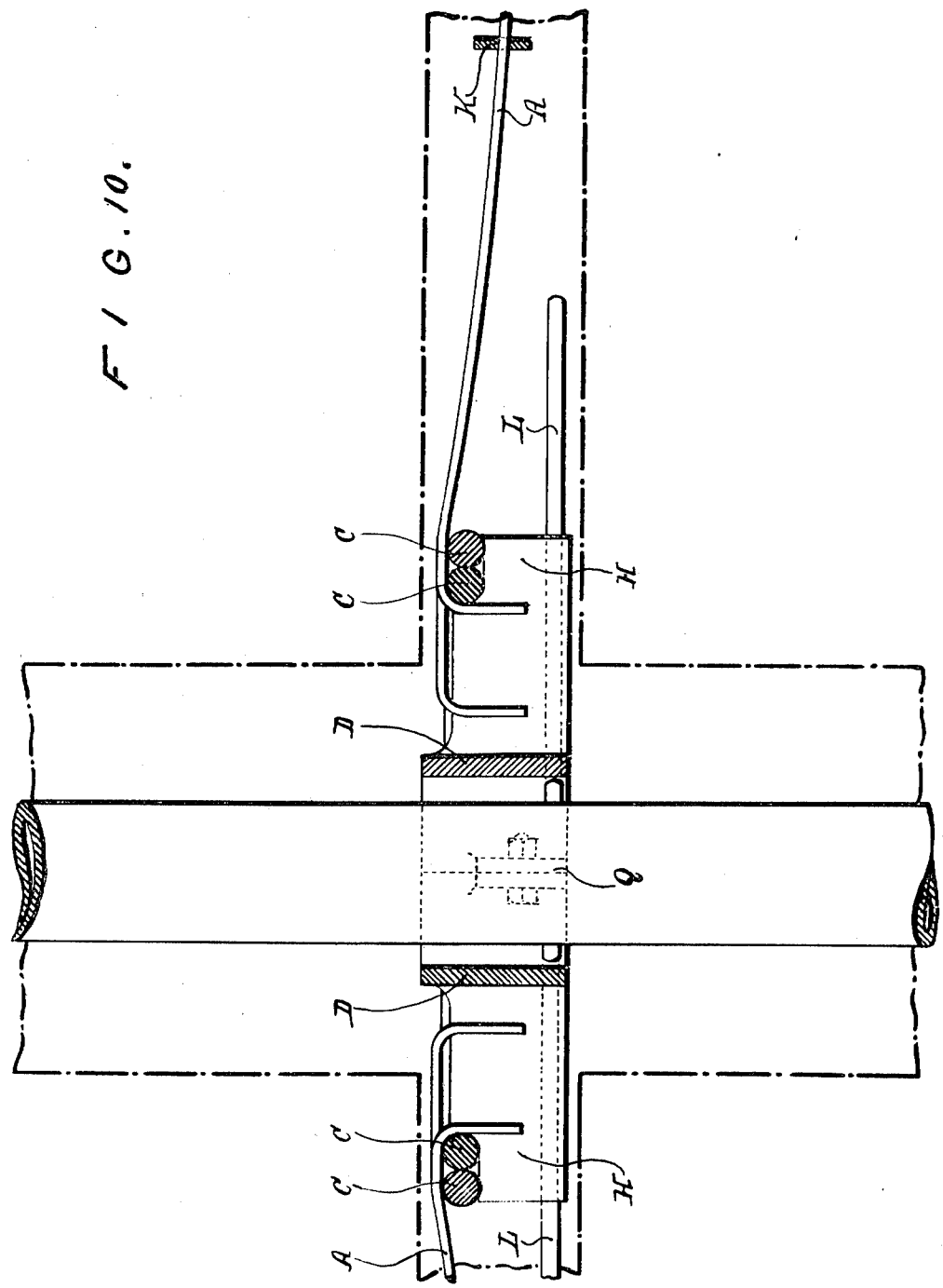

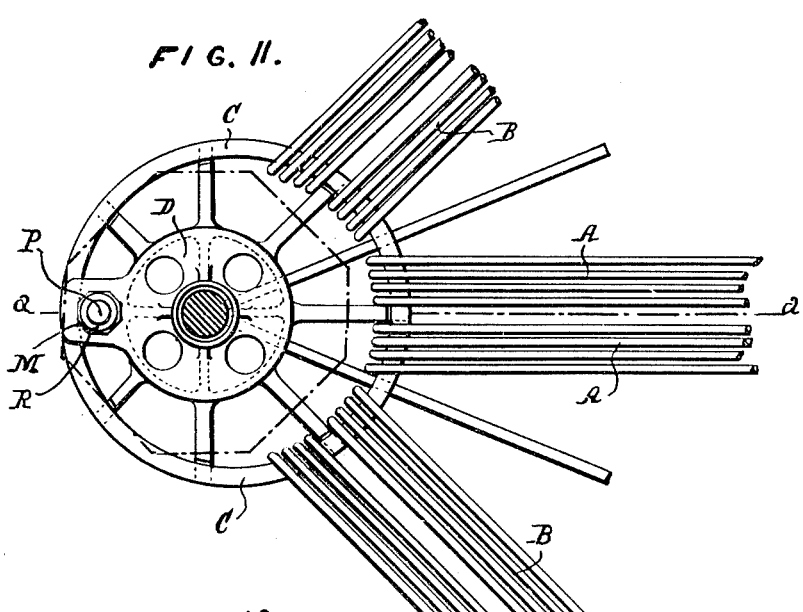
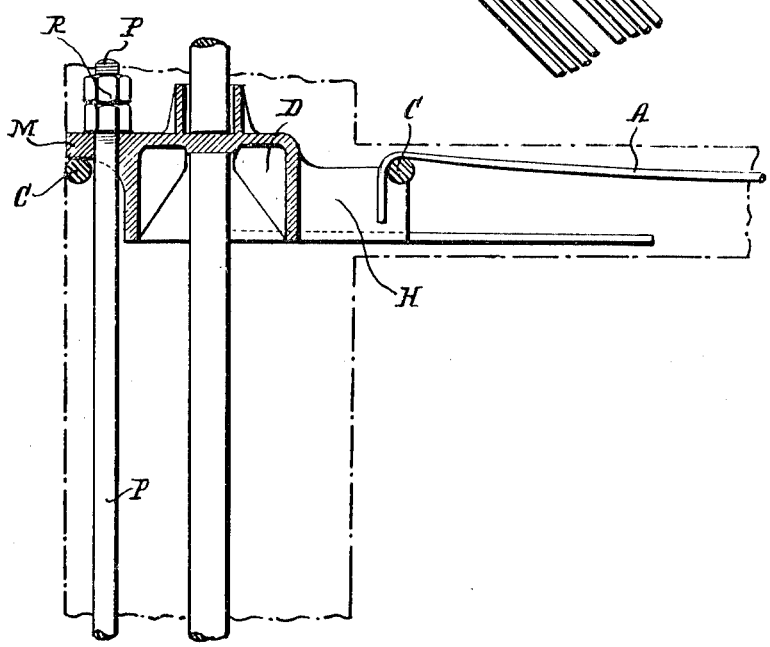

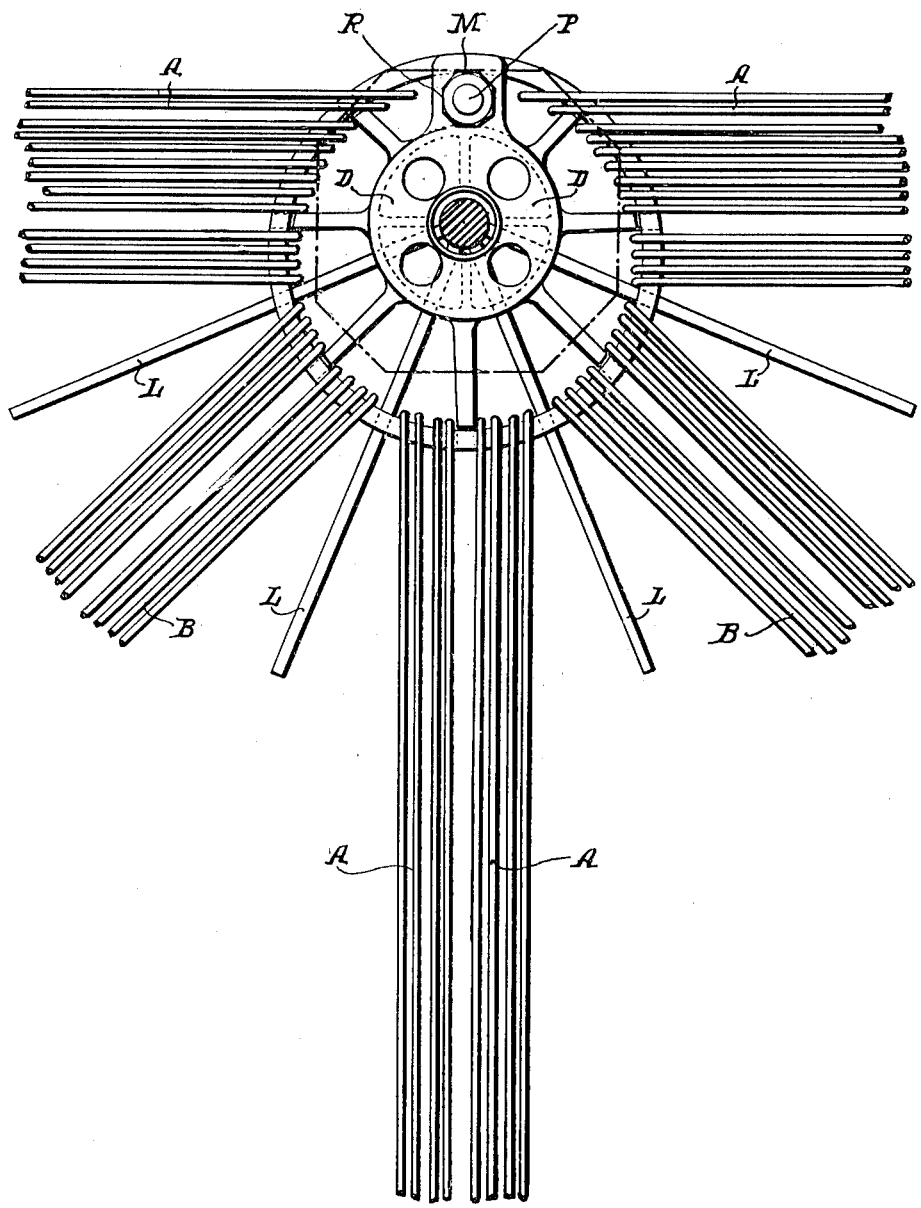

UNITED STATES PATENT OFFICE.

ROBERT THOMSON AND WILLIAM AFFLECK THOMSON, OF POLLOKSHIELDS, GLASGOW, SCOTLAND.

FERROCONCRETE FLOOR.

1,074,072. Specification of Letters Patent. Patented Sept. 23, 1913.

Application filed October 12, 1911. Serial No. 654,335.

*To all whom it may concern:*

Be it known that we, ROBERT THOMSON and WILLIAM AFFLECK THOMSON, subjects of the King of Great Britain and Ireland, and residents of Pollokshields, Glasgow, Scotland, have invented certain new and useful Improvements in Ferroconcrete Floors, and of which the following is the specification.

This invention relates to ferro-concrete floors and has for its object their more efficient and more economical construction.

According to existing methods of constructing column-supported and other types of floors, the floor load is usually transmitted to the supports indirectly by means of beams. It has, however, also been proposed to transmit the floor load to its supports by means of reinforcing tensional members arranged within the floor itself.

The invention is of the last mentioned type and consists broadly in the employment, together with other reinforcing members of reinforcing rods which are carried between each pair of diagonally-opposite corner supports, and in the employment of anchorage whereby these and other reinforcing members when incased in concrete to form the floor are rigidly held in position and the floor thus formed is securely anchored to its supports.

A method of carrying out the improved system of construction will now be given, taking as an example a building having column supported floors, the section to be described being one of the intermediate rectangular floor areas embraced within four columns—one at each corner of the rectangle.

Each of the supporting columns is provided with a cap or collar at the floor level on which to support an anchorage to receive the ends of the primary reinforcing members, while within the area embraced by the columns temporary centering is provided on which to carry the plastic concrete which is to form the floor.

The anchorages consist of rings, or ring-like, or other members adapted to receive the primary members and of such form that the stresses applied to them by the primary reinforcing members act radially and are radially balanced. When rings are used, they encircle the columns, resting loosely on the caps or collars above mentioned, space being left between them and the caps or collars to receive the ends of the reinforcing members.

What have been called the primary reinforcing members, consist partly of rods arranged in groups on each of the four sides of the rectangle between the columns, and partly of groups of rods carried between each pair of diagonally opposite columns, inclosing the rectangle. The rods may be of any convenient shape in cross section. Both ends of each of these reinforcing rods are preferably turned down, so that when laid in position they hook over the rings encircling the columns, or they are otherwise provided with means for engaging these rings or ring-like members. Secondary reinforcing rods may also be employed. The first series of these are preferably laid so as to form a rectangular or diamond shaped area, the corners of which rest over the center of the side spans of primary reinforcing rods, and preferably passing underneath the groups of diagonal reinforcing rods so that they may transmit some of the stresses of the longer diagonal spans to the shorter side spans—by this means the number of rods in diagonal and side groups may be equalized.

A second series of secondary reinforcing rods, if required, may be arranged so as to pass through opposite angles of the first series of secondary reinforcement.

Further series of secondary reinforcement, if required, may be arranged so as to equally divide the interspaces formed by the reinforcement already in position.

The primary reinforcing rods are so arranged that at the supports they lie near the upper surface of the concrete which is to form the floors, and at the center of their span they lie near its lower surface so that they assume the natural sag of their loads.

After the primary reinforcing members have been arranged in position, concrete of suitable composition is then filled in on the centering. The laying of the concrete is regulated so as to admit of the secondary reinforcing rods being laid with the proper sag *i. e.* the tensional curve assumed under their load, and is continued until the whole of the reinforcement and anchoring rings are incased therein. The concrete in setting, firmly fixes rods and rings in position and thus securely interlocks the anchoring rods in the floor thus formed, and it to its supporting cap or collar.

Where the floor is continuous over a number of supports, the anchoring rings may receive and hold the ends of the primary reinforcing rods of the several adjoining rectangular areas.

In order that the invention and the manner of performing the same may be properly understood, there are hereunto appended eight sheets of explanatory drawings showing examples of the improved construction, Figure 1 Sheet 1 being a plan and Figs. 2, 3 and 4, Sheet 2, sections on the lines $a-a$, $b-b$ and $c-c$, Fig. 1 of one example and Fig. 5, Sheet 3, a plan and Figs. 6 and 7, Sheet 4, respectively a sectional plan, a sectional side elevation to an enlarged scale of details of the other example, and Fig. 8 a perspective view of a common detail, while Figs. 9 and 10, Sheets 5 and 6, are respectively, a plan and a sectional elevation of a third example, Figs. 11 and 12, Sheet 7, a plan and a sectional elevation of a fourth example, and Fig. 13, Sheet 8 a plan of a fifth example.

In these examples the ring or ring-like members to which the primary reinforcing members of the floor are connected are of the form, and are arranged in combination with load distributing column caps, of the type in which there is a cap which engages the core or cores of the column and also the concrete monolith thereof, but it is to be understood that the primary-member-supporting ring or other device may be of other forms adapting the invention for use with other columns or floor supports of reinforced concrete or other material.

In the example shown in Figs. 1 to 4, in which Fig. 1 is that part of a floor supported by four columns and understood to be supported by other columns spaced equivalently farther out, there are series of primary reinforcing rods A arranged in groups on all four sides of the rectangle formed by the four columns shown, and series of like rods B in groups diagonal to the rectangle, both series of rods being arranged in like fashion toward other columns or supports beyond that particular area shown. The ends of these primary reinforcing rod-members A B are bent down hook-wise as shown in Figs. 2 and 3, their turned down ends being carried well down onto the compression area of the concrete, and are engaged over anchoring ring-members C which are supported on caps D which in turn are carried in or upon the column structures. The rods A B are bent so that at their anchored ends they are near the upper surface of the floor (indicated by chain lines in Figs. 2, 3 and 4) and at their centers they are near the under surface of the floor—their curves being substantially that due to their tensional loading by the floor load. Intercalated with the primary rods are a series of secondary rods E parallel with the rods A and shown singly for clearness but which may be in groups, and a series of rods G parallel with the primary rods B. These secondary rods, while preferably anchored in the concrete mass by the hook-like bending of their ends, are not otherwise anchored. It will be seen that they are so positioned as to subdivide the areas between the primary rods A B. Further series of secondary rods further subdividing the areas may obviously be applied.

Where the primary and secondary rod members intersect one another they are passed at such levels (as indicated in Figs. 2, 3 and 4) as to subdivide the vertical area of the floor in adequate manner at that point. To the end that the stresses in primary and secondary rod groups may be equalized, the latter are arranged with their ends over the rectangular and their more median parts underneath the diagonal primary rod groups.

The example shown in Figs. 5, 6, 7 and 8 is for a floor of wider span between columns or other supports, and differs only from that described in that the anchoring ring-members C are supported by brackets H and tie rods J from the ring N resting on brackets on the caps D, and in that in length each primary reinforcing member A or B consists of two groups of rods.

In order to facilitate the assembly of the groups of rods forming primary or secondary reinforcing members, they may be strung through two or more distance pieces K (Fig. 8) pierced to receive them.

In Figs. 9 and 10 is shown an example such that it and the floor it is an anchorage for may be applied to existing columns which are being reinforced. In this example the cap D, which cannot of course rest upon the top of the column at floor level, as that is already in place with another superposed, is divided in halves diametrically. The cap halves are placed about the column shaft and are then bolted together through radial flanges Q. Instead of a single ring member C, two such members are used each having an opening to pass the column core. They are assembled upon the cap bracket arms one within the other, and the gap in one diametrically opposite the gap in the other, so that they thus mutually support and reinforce one another. The outlines of the completed reinforced floor and column are indicated by chain lines. In this example there are shown two additional devices applicable to those other examples already discussed. Firstly, and in order to reinforce the overhanging bracket arms of the cap against fracture, certain of the hook ended reinforcing rods A B are extended inward to the space within the ring members C, and secondly rods L extending radially outward from the column core (which they abut) immediately beneath the cap, therefore at the lower part of the floor's thickness and therefore in compression, are provided to further relieve the cap bracket arms from bending stress and to assist the concrete in meeting the compressional stresses at the column head.

The examples so far discussed have been applicable only in the main area of the floor. It is evident that the anchoring devices about the periphery of the floor must be modified to suit those different conditions under which they then act.

In Figs. 11 and 12 is shown a column cap and anchoring devices for application at a floor corner. The modification of the cap D, which may follow in construction any of the examples hereinbefore described, consists in that the ring member C and the bracket arms H, which support it are eccentric to the cap and column axis and that diametrically opposite the mean center of the group of reinforcing rods A B there is provided on the cap a stout lug M taking over the ring member C. Through this lug there is passed a tension rod P extending down to the base anchorage of the column (not shown). Its end is screwed, and there are provided nuts R for applying such tension as to give the proper cantaliver action to the cap and ring member so that the main load stresses may be delivered axially to the column.

The example shown in Fig. 13 only differs in that cap and ring are modified in form for application along the straight margin of the floor.

In the case of successive floors and columns one above the other, the tension rods P are of course interconnected directly or through the lugs M.

In constructing a floor in the improved manner, the anchor members and the reinforcing members are first assembled. Usual shuttering is then applied beneath and concrete mixture filled in.

It is to be understood that the foregoing examples have been given illustratively and not limitatively—the essence of the invention lies in the anchor devices—rings or equivalent column carried structures—in combination with primary tensional rod members extending directly between them and it may be with secondary members subdividing the areas inclosed by the primary members but without metallic compression members. Therefore, the anchor devices, while, with simplicity of ring form, may be of other equivalent form adapted to receive the ends of the primary members and may be adapted to suit any form of columnar or like structure on which they may be supported, and the primary rod members may be attached to the anchor devices, by any convenient means.

Again, while the primary and secondary members are shown as composed of rods of circular section, it is clear that the invention lies in their purpose more than in their form—they may be composed otherwise than of rods, and if of rods, the rods may be of other than circular section.

What we claim is:—

1. A ferro-concrete floor structure comprising columnar substructures spaced apart, subdivided anchor devices clamped to the upper portion of each columnar substructure at the floor level, gapped anchor rings supported thereby, the rings being one within the other with the gap in one diametrically opposite the gap in the other, primary tensional reinforcing rod members extending between and secured to said anchor rings and in groups radial to them, and coacting compressional concrete masses around and between said tensional members, the tensional rod members reinforcing by their tension the concrete masses, and the concrete masses reinforcing by compression the tensional members.

2. A ferro-concrete floor structure comprising columnar substructures spaced apart, subdivided anchor devices clamped to the upper portion of each columnar substructure at the floor level, gapped anchor rings supported thereby, the rings being one within the other with the gap in one diametrically opposite the gap in the other, primary tensional reinforcing rod members extending between and secured to said anchor rings and in groups radial to them, secondary unanchored tensional rod members intercalated among and subdividing the spaces between the primary members.

3. A ferro-concrete floor structure comprising columnar substructures spaced apart, ring-like anchor devices supported on each of said substructures and lying outside the columnar area, supplemental anchor devices lying within the columnar area and tensional members uniting said anchor devices to each other, in combination with primary tensional reinforcing rod members extending laterally from the anchor devices lying outside the columnar area and being arranged radially in groups, and coacting compressional concrete masses around and between said tensional members, the tension rod members reinforcing by their tension the concrete masses and the concrete masses reinforcing by compression the tensional members.

4. A ferro-concrete floor structure comprising columnar substructures spaced apart, ring-like anchor devices supported on each of said substructures and lying outside the columnar area, supplemental anchor devices lying within the columnar area and tensional members uniting said anchor devices to each other, in combination with primary tensional reinforcing rod members extending laterally from the anchor devices lying outside the columnar area and being arranged radially in groups, secondary unanchored tensional rod members intercalated among and subdividing the space between the primary members and coacting compressional concrete masses around and between said tensional members, the tension rod members reinforcing by their tension the concrete masses and the concrete masses reinforcing by compression the tensional members.

5. A ferro-concrete floor structure comprising ring-like anchor devices, columnar substructures spaced apart and supporting said devices, primary tensional reinforcing rod members extending rectangularly and diagonally between said anchor devices and secured thereto, secondary unanchored reinforcing rod series, one series in parallel with the rectangularly arranged primary rods and a second series in parallel with the diagonal primary rods, said secondary rods being arranged with their ends over the rectangularly arranged primary rods and their more median parts beneath the diagonally arranged primary rods, together with coacting compressional concrete masses around and beneath said tensional members, the tensional rod members reinforcing by their tension the concrete masses and the concrete masses reinforcing by compression the tensional members.

6. A ferro-concrete floor structure having anchor devices comprising concentric anchor rings, substructures supporting said anchor devices, tensional reinforcing rod members extending between the outer rings of independent anchorages and supplemental tension devices uniting the outer and inner ring of each anchor.

7. A ferro-concrete floor structure having anchor devices comprising a cap, a supporting substructure therefor, an inner ring on said cap, an outer ring and brackets on said cap supporting the latter, tie rods between said rings and tension rod members extending radially from said outer ring, for the purpose specified.

In testimony whereof we have signed our names to this specification, in the presence of two subscribing witnesses.

ROBERT THOMSON.
WILLIAM AFFLECK THOMSON.

Witnesses:
DAVID FERGUSON,
JAMES EAGLESOM.